US012603877B2

(12) United States Patent
Monteremand et al.

(10) Patent No.: US 12,603,877 B2
(45) Date of Patent: Apr. 14, 2026

(54) METHOD AND DEVICE FOR CONTROLLING THE EXECUTION OF AT LEAST ONE ACTION OF AN OBJECT CONNECTED IN A COMMUNICATION NETWORK

(71) Applicant: SOMFY ACTIVITES SA, Cluses (FR)

(72) Inventors: Laurent Monteremand, Cluses (FR); Frédéric Janot, Saint-Sixt (FR)

(73) Assignee: SOMFY ACTIVITES SA, Nouveau Monde Cluses (FR)

( * ) Notice: Subject to any disclaimer, the term of this patent is extended or adjusted under 35 U.S.C. 154(b) by 51 days.

(21) Appl. No.: 18/910,150

(22) Filed: Oct. 9, 2024

(65) Prior Publication Data

US 2025/0119420 A1 Apr. 10, 2025

(30) Foreign Application Priority Data

Oct. 10, 2023 (FR) ....................................... 2310813

(51) Int. Cl.
*H04L 9/40* (2022.01)
(52) U.S. Cl.
CPC ...... *H04L 63/0823* (2013.01); *H04L 63/0428* (2013.01)
(58) Field of Classification Search
CPC . H04L 63/0823; H04L 63/0428; H04L 67/12; H04L 63/10; H04W 84/18; H04W 12/08; G06F 21/10
See application file for complete search history.

(56) References Cited

U.S. PATENT DOCUMENTS 9,325,698 B2 * 4/2016 Lovmand ................ G06F 21/62
9,602,292 B2 * 3/2017 Ramatchandirane ........................
H04L 63/0823
(Continued)

FOREIGN PATENT DOCUMENTS

CN 108076089 A * 5/2018 ........... H04L 67/146
CN 104429042 B * 1/2019 ........... H04W 12/04
(Continued)

OTHER PUBLICATIONS

Preliminary Search Report dated Apr. 12, 2024 in corresponding French Application No. 2310813.
(Continued)

*Primary Examiner* — John B King
(74) *Attorney, Agent, or Firm* — B. Aaron Schulman, Esq.; Stites & Harbison, PLLC

(57) ABSTRACT

This method comprises opening (82) a secure connection between a connected building object and a remote controller, implementing a first security certificate of the connected object and a second security certificate of the remote controller, and receiving via said secure connection (42) a command to perform at least one action issued by the remote controller, followed by the steps of:

extracting (86) a value from a predetermined field of the second security certificate, referred to as the remote controller's access authorisation value;

checking (90), in a structure for storing associations between access authorisation values and sets of authorised commands, that said received command belongs to a set of at least one authorised command associated with said access value; and if the check is positive, executing (92) at least one action associated with the received command.

11 Claims, 5 Drawing Sheets

(56) References Cited

U.S. PATENT DOCUMENTS

| | | | | |
|---|---|---|---|---|
| 9,865,126 | B2 * | 1/2018 | Saunders | G07F 17/323 |
| 11,337,075 | B2 * | 5/2022 | Ramisetty | H04L 63/0853 |
| 2005/0144463 | A1 * | 6/2005 | Rossebo | H04L 63/0815 |
| | | | | 713/185 |
| 2016/0105288 | A1 | 4/2016 | Logue | |
| 2017/0155647 | A1 * | 6/2017 | Hennebert | H04L 63/08 |
| 2022/0417038 | A1 | 12/2022 | Kravitz et al. | |

FOREIGN PATENT DOCUMENTS

| | | | | | |
|---|---|---|---|---|---|
| EP | 2634990 | A1 * | 9/2013 | | H04L 12/2834 |
| EP | 3539045 | B1 * | 12/2020 | | G06F 21/6218 |
| EP | 3662366 | B1 * | 8/2023 | | G06F 9/452 |
| WO | WO-2013110669 | A2 * | 8/2013 | | H04N 21/835 |
| WO | WO-2021195900 | A1 * | 10/2021 | | H04W 12/108 |

OTHER PUBLICATIONS

Rantala, et al., "Resilient and adaptive public-key infrastructure for distributed city-wide surveillance systems", Dec. 13, 2013, pp. 247-252, 2013 IEEE International Conference on Granular Computing (GRC), IEEE, XP032567385.

* cited by examiner

METHOD AND DEVICE FOR CONTROLLING THE EXECUTION OF AT LEAST ONE ACTION OF AN OBJECT CONNECTED IN A COMMUNICATION NETWORK

This application claims priority to French Patent Application No. 2310813 filed Oct. 10, 2023, the entire disclosure of which is incorporated by reference herein.

FIELD OF THE INVENTION

The present invention relates to a method for controlling the execution of at least one action by a connected object for a building in a communication network, and to an associated device for controlling the execution.

The invention is particularly applicable in home automation systems for buildings comprising at least one connected object, and for the command, configuration and/or maintenance of a home automation system for buildings.

BACKGROUND OF THE INVENTION

More generally, the invention relates to the field of the Internet of Things (IoT) for buildings, for both commercial and residential buildings, whether for individual or collective use.

The expression "Connected object" refers to an electronic object connected by wire or wireless means to a communication network, and configured to transmit or receive data via the communication network.

"Connected building object" or "connected object for a building" refers to a connected object or equipment adapted to be arranged in a building, and configured to provide comfort and energy management functions, such as heating, ventilation and air conditioning, but also functions of lighting management and control of openings, such as blinds or roller shutters placed in front of the building's windows, or remote security by controlling locking systems (doors, locks).

Typically, the equipment in a building is connected to a command unit, which supervises the equipment and controls its operation.

When a communication network is implemented in a home automation system comprising at least one connected object, the connected object can be controlled remotely, by a remote controller, via the communication network, for example using one or more gateway network devices. It is therefore preferable to add a level of security to ensure that control of the connected object is actually carried out by an authorised third party, via corresponding access rights.

To ensure security, it is known to secure access to the connected object using a password by individually allocating a unique password for each connected object, the unique password being indicated, for example, on the label of the connected object in plaintext or encoded in a datagram such as a QR code. A user with this unique password can connect individually to the connected object to send it a command associated with an action. However, setting up a secure connection using a unique password with each connected object is not feasible in certain specific use cases, for example during the installation and configuration phase of a home automation system comprising a large number of connected objects, in which case the installer would have to use as many unique passwords as there are connected objects.

There is therefore a need to secure access to control the execution of actions by connected building objects connected to a communication network, while facilitating secure access for a large number of connected objects.

SUMMARY OF THE INVENTION

To this end, the object of the invention is a method for controlling the execution of at least one action by a connected building object in a communication network, said connected building object comprising a network interface allowing connection to said communication network, said execution being commanded by a remote controller adapted to connect to said communication network, the method being implemented by a processing unit of said connected building object adapted to execute at least one action of the connected building object, and comprising at least the steps of:

opening a secure connection between said connected building object and the remote controller, implementing a first security certificate of the connected object and a second security certificate from the remote controller, the step of opening a secure connection allowing encrypted communication between said connected building object and the remote controller, and comprising reception of the second security certificate from the remote controller; and receiving, via said secure connection, a command to execute at least one action issued by said remote controller, according to a communication protocol.

The method further comprises the steps of:

extracting a value from a predetermined field of the remote controller's second security certificate, referred to as the remote controller's access authorisation value;

checking, in a structure for storing associations between access authorisation values and sets of authorised commands, that said received command belongs to a set of at least one authorised command associated with said access value, the storage structure being stored in an electronic memory of said connected building object, and if the check is positive, executing at least one action associated with the received command.

Advantageously, the proposed method makes it possible to use the same security certificate to establish a secure connection and to verify, in a storage structure saved in a memory of the connected object, using the authorisation value extracted from the predetermined field of the remote controller's security certificate, whether the remote controller is actually authorised to command the execution of one or more actions.

The method for controlling the execution of at least one action by a connected building object in a communication network according to the invention may also have one or more of the features below, taken independently or in any technically conceivable combination.

The method further comprises a step in which, in the event of a negative check, said at least one action associated with the received command is not carried out, and a warning is sent via said secure connection.

The extraction step further comprises extracting a second value from a predetermined field of the second security certificate from the remote controller in order to obtain an identifier of a third party operating said remote controller.

The method further comprises a step of storing, in an execution report, said received command in association with the identifier of the third party operating said remote controller.

When the processing unit of the connected building object is configured to open a plurality of secure connections in parallel, the opening of a secure connection with a given remote controller depends on the access authorisation value extracted from the second security certificate of said remote controller.

The checking step implements a storage structure in the form of a table associating, with each access authorisation value of the remote controller, a list of at least one command for the execution of at least one action by the connected building object.

When the connected building object stores the first security certificate of the connected building object, in the step of opening a secure connection, the processing unit of the connected building object determines whether the second security certificate received from the remote controller and the first security certificate of the connected building object are signed by the same trusted third party, in order to register, if necessary, the second security certificate from the remote controller as a trusted security certificate in a public key infrastructure contained in its electronic memory.

The method also comprises a step of downloading into an electronic memory of the connected building object an update file for at least one executable program implemented by the processing unit of the connected building object, the received command being comprised in a set of commands for adjusting the connected building object, the action associated with the received command being an implementation of the said file.

The connected object is a piece of home automation equipment in a building automation system.

According to another aspect, the invention relates to a device for controlling the execution of at least one action by an object connected in a building communication network, implemented in said connected building object, the connected building object comprising a network interface allowing a connection to said communication network, said execution being controlled by a remote controller adapted to connect to said communication network, said connected object comprising a processing unit of said connected building object adapted to execute at least one action of the connected building object, and comprising at least:

a module for opening a secure connection between said connected building object and the remote controller, implementing a first security certificate of the connected object and a second security certificate from the remote controller, opening a secure connection allowing encrypted communication between said connected building object and the remote controller, and comprising reception of the second security certificate from the remote controller; and a module for receiving, via said secure connection, a command to execute at least one action issued by said remote controller, according to a communication protocol.

The processing unit further comprises:

a module for extracting a value from a predetermined field of the remote controller's second security certificate, referred to as the remote controller's access authorisation value;

a module for verifying, in a structure for storing associations between access authorisation values and sets of authorised commands, that said received command belongs to a set of at least one authorised command associated with said access value, the storage structure being stored in an electronic memory of said connected building object, and a module for executing, if the check is positive, at least one action associated with the received command.

According to another aspect, the invention relates to a system for controlling the execution of at least one action by a connected building object in a communication network, the system comprising said connected object and a remote controller, said connected object comprising a device for controlling the execution of at least one action as briefly described above.

According to another aspect, the invention relates to an information storage medium, on which are stored software instructions for executing a method of controlling the execution of at least one action by a connected object in a communication network as briefly described above, when these instructions are executed by a programmable electronic device.

The invention further relates to a computer program comprising software instructions which, when executed by a computer, implement a remote method for executing at least one action by a connected object in a communication network as defined above.

BRIEF DESCRIPTION OF THE DRAWINGS

The invention will appear more clearly when reading the description that follows, given solely as a non-limiting example and made in reference to drawings in which.

DETAILED DESCRIPTION OF EMBODIMENTS

Figure 1:
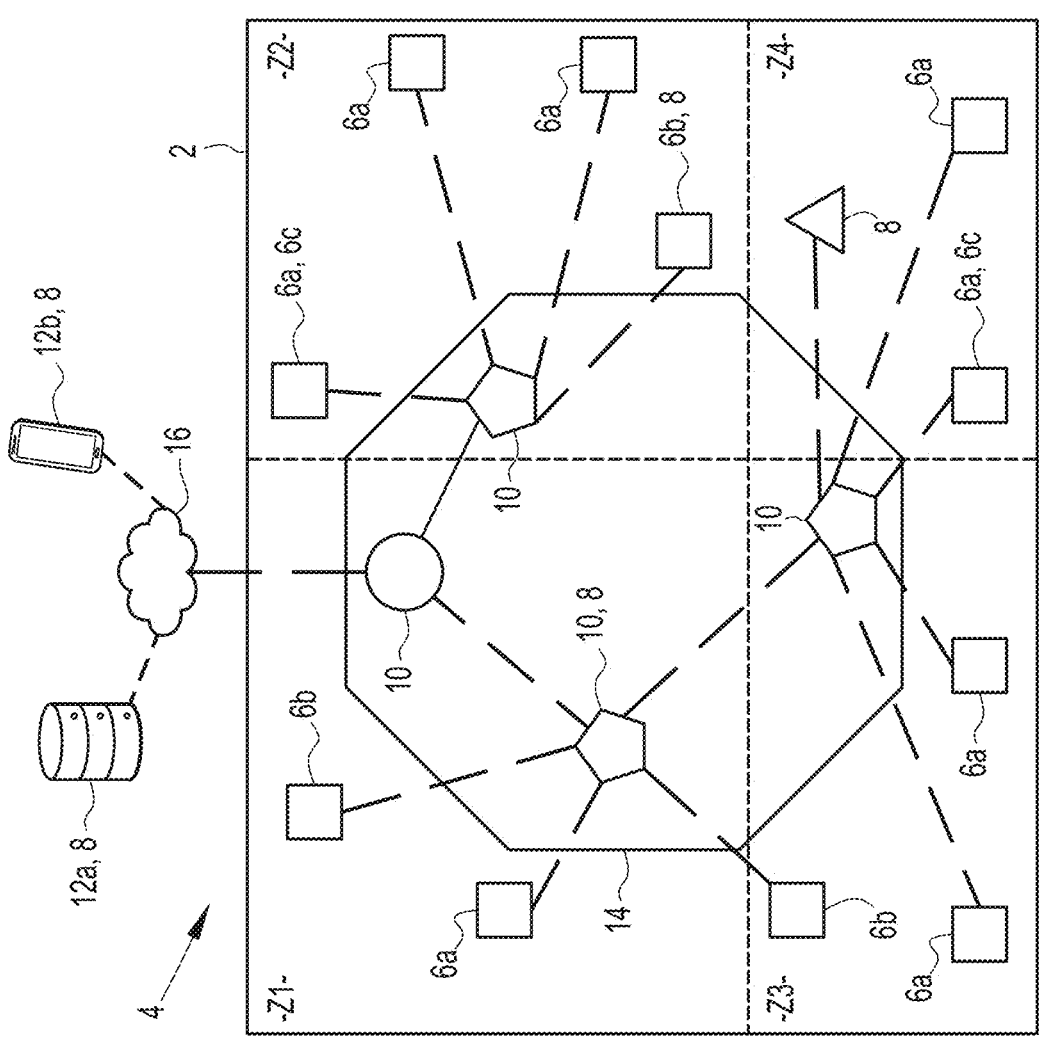
FIG. 1 is a schematic representation of a home automation system for connecting connected building objects.

FIG. 1 shows a schematic representation of a building 2 comprising, for example, four rooms or zones Z1, Z2, Z3 and Z4. The building 2 is, for example, an office complex, or a residential building, or a commercial or industrial building, or any combination of these. This could be an apartment building or a detached house.

The building 2 is equipped with a home automation system 4 according to a first embodiment of the invention. The home automation system 4 comprises a set of connected building objects distributed across the zones Z1, Z2, Z3 and Z4 of the building 2. The set of connected building objects comprises at least one connected building object 6. Each connected building object 6 in the set of connected building objects is connected to a communication network 14.

An object connected to a communication network means an electronic object connected by wire or wirelessly to a communication network, in this case to the communication network 14, and configured to transmit and/or receive data via the communication network 14 using a wired communication protocol (e.g. Ethernet, Power-over-Ethernet, USB, FireWire, RS-485, Arcnet, FDDI, Token Ring, etc.) or a wireless one (e.g. Wi-Fi, Thread, ZigBee, Z-Wave, Bluetooth, BLE, IrDA, etc.).

The expression "connected building object" refers to a connected object or equipment adapted to be arranged in a building, here in the building 2, and configured to provide comfort and energy management functions, such as heating, ventilation and air conditioning, but also functions of lighting management and control of openings, such as blinds or roller shutters placed in front of the building's windows, or remote security by controlling locking systems (doors, locks).

A connected building object 6 is, for example, a controllable home automation device 6a, a command unit 6b or a sensor 6c.

A controllable home automation device 6a is at least configured to receive data via the communication network 14 according to a wired or wireless communication protocol, the data comprising at least one command associated with at least one action of the controllable home automation device 6a.

A controllable home automation device 6a is, for example, an actuator arranged to move or set an element of the building 2, for example an electromechanical actuator for moving a roller shutter or a patio awning, or a regulation system for a heating or ventilation system. A controllable home automation device 6a may also be a light, for example an outdoor patio light or a lighting control system, or an alarm siren in an alarm system.

A command unit 6b is at least configured to transmit data via the communication network 14 according to a wired or wireless communication protocol, the data comprising at least one command associated with at least one action of a controllable home automation device 6.

A command unit 6b is designed to receive control instructions from a user of the building 2, with a view to directly or indirectly controlling one or more of the controllable home automation devices 6a of the home automation system 4.

A command unit 6b is, for example, a central command unit, commonly known as a "home automation box", or a fixed or mobile command unit.

A sensor 6c is designed to convert at least one physical variable relating to the state of the building 2, or to the environment of the building 2, or to the at least one connected building object 6 of the home automation system 4, into at least one signal proportional to this at least one physical variable.

This signal is, for example, an electrical signal, a light signal or a radio frequency signal. This signal is then transmitted by the sensor 6c to at least one connected building object 6 in the home automation system 4. A sensor 6c is, for example, an alarm system or a video camera, in particular a video surveillance camera.

One or more sensors 6c may be integrated into a controllable home automation device 6a or a command unit 6b. The home automation system 4 may also comprise one or more independent sensors.

The home automation system 4 also comprises at least one remote controller 8 connected to the communication network 14. The remote controller 8 is configured to control and/or configure at least one connected building object 6 of the set of connected building objects of the home automation system 4.

The remote controller 8 is operated by at least one third party, for example an installer, user or maintenance agent of the home automation system 4.

Within the meaning of the invention, the term "remote" of the remote controller 8 indicates that the remote controller 8 is physically remote from the connected building object 6 that it is configured to control and/or configure, and is in no way limited to the location of the remote controller 8 relative to the building 2, as the remote controller 8 may be located inside or outside the building 2.

Advantageously, the remote controller 8 is a tool for controlling and/or configuring the at least one connected building object 6 that it is intended to control and/or configure.

The remote controller 8 may be any of the connected building objects 6 in the set of connected building objects of the home automation system 4, such as a controllable home automation device 6a, a command unit 6b, or a sensor 6c.

The communication network 14 may be of any type, for example a wired PAN or wireless WPAN personal area network, a wired LAN or wireless WLAN local area network, or any combination of at least two networks, including in this case at least one piece of network equipment 10 acting as a gateway enabling communication from one network to the other.

Advantageously, the communication network 14 is connected to an extended or external communication network 16, such as the Internet, via network equipment 10 acting as an access point to the extended or external network 16. In this way, each connected building object 6 of the home automation system 4 can communicate with at least one remote device 12 connected to the extended or external communication network 16, to send reports on the operating status of the home automation system 4 for diagnostic purposes, or to receive control and/or configuration instructions.

A remote device 12 is, for example, a fixed remote device 12a connected to the extended or external network 16, such as a computer server and/or a Building Management System BMS, or a mobile remote device 12b connected to the external extended or external network 16, such as a smartphone, a touch-sensitive tablet or any other equivalent device.

The communication network 14 may be as multipoint and/or point-to-point and may be made up of one or more network devices 10 not shown, such as routers and/or gateways, enabling the connected building objects of the home automation system 4 to communicate with each other and/or with the at least one remote controller 8.

The remote controller 8 can be any of the remote equipment 12 connected to the communication network 14 via the extended or external communication network 16. In this way, the remote controller 8 can communicate from the extended or external communication network 16 with the at least one connected building object 6 that it is configured to control and/or configure.

Figure 2:
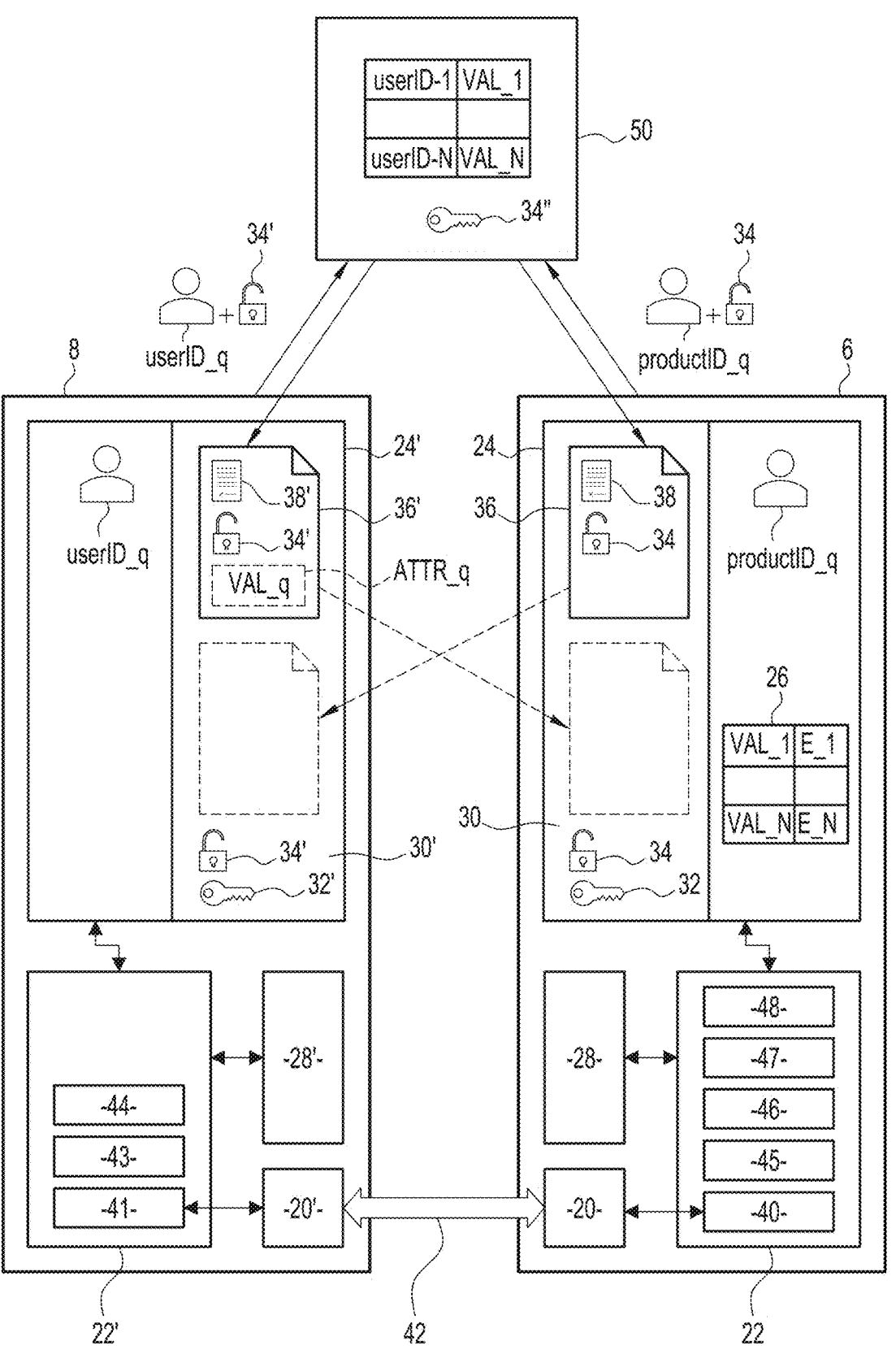
FIG. 2 is a schematic representation of a communication system implementing a control of the execution of at least one action by a connected object of a home automation system.

FIG. 2 schematically illustrates a system for controlling the execution of actions by a connected building object 6 in a communication network 14, the connected building object 6 being any one of the set of connected building objects 6 of the home automation system 4 installed in the building 2.

Generally speaking, each connected building object 6 comprises a low-level communication interface 20, commonly referred to as a network interface, operating at the physical layer of the communication network 14 and enabling the connected building object 6 to connect to the communication network 14. In this way, each connected building object 6 can communicate with at least one other device connected to the communication network 14, such as another connected building object 6 of the home automation system 4, a remote controller 8, and/or remote equipment 12a, 12b via the extended or external communication network 16.

Advantageously, the network interface 20 is a wired network interface according to a wired communication protocol, such as the IEEE 802.3 standard communication protocol, generally known as Ethernet.

Optionally, the network interface 20 may also comply with a PoE (Power-over-Ethernet) Ethernet cable power supply protocol, enabling the connected building object 6 from PoE power supply equipment, the PoE power supply equipment advantageously being network equipment 10 of the communication network 14 to which the connected building object 6 is connected.

In a variant, the network interface 20 is a wireless network interface according to a wireless communication protocol, such as the IEEE 802.11 standard communication protocol, or the IEEE 802.15.1 standard communication protocol, or the IEEE 802.15.4 standard communication protocol.

The connected building object 6 also comprises at least one processing unit 22 connected to the network interface 20, and at least one electronic memory 24 connected to the processing unit 22.

The network interface 20 of the connected building object 6 is adapted to communicate, via an internal data link, with the processing unit 22, for example a microcontroller or a plurality of logic units, the processing unit 22 being configured to control actions, in relation to the functionality of the corresponding connected building object 6. For example, the actions can be accessed using an application programming interface (API) implemented by the processing unit 22.

The electronic memory 24 of the connected building object 6 contains a public key infrastructure (PKI) 30.

The electronic memory 24 of the connected building object 6 stores in its public key infrastructure 30 a first pair of keys 32, 34 consisting of a first private key 32 and a first public key 34, the first private key 32 being associated with the first public key 34, the first private key 32 being configured to decrypt a message which has been encrypted with the corresponding first public key 34.

The electronic memory 24 of the connected building object 6 also stores a first security certificate 36 in its public key infrastructure 30. The first security certificate 36 is unique to the connected building object 6.

Within the meaning of the invention and in a manner known to those skilled in the art, a security certificate, also known as a public key certificate or electronic certificate, is a nominative digital document representing a user, a computer, a service or a device. A security certificate contains the public key of the security certificate subject, and does not contain the private key of the security certificate subject, which must be stored securely. A security certificate is digitally signed by a trusted third party, and for this purpose contains at least one signature constructed from the trusted third party's private key. Once issued, a security certificate is forgery-proof, nominative and certified by the trusted third party.

In one embodiment, the first security certificate 36 of the connected building object 6 is a TLS/SSL type public key certificate compliant with the X.509 standard, the format of which is more particularly described in the IETF document RFC 5280 *"Internet X.509 Public Key Infrastructure Certificate and Certificate Revocation List (CRL) Profile"*.

In a variant, the first security certificate 36 of the connected building object 6 is a TLS/SSL type public key certificate compliant with the OpenPGP standard, the format of which is more particularly described in the IETF document RFC 4880 *"OpenPGP Message Format"*, and whose use in TLS/SSL-secured communications is described in the IETF's RFC 6091 *"Using OpenPGP Keys for Transport Layer Security (TLS) Authentication"*.

Here, the first security certificate 36 of the connected building object 6 represents the connected building object 6, and contains at least the first public key 34 of the connected building object 6, and a first digital signature 38 of a trusted third party 50. The first digital signature 38 of the trusted third party 50 is constructed from the private key of the trusted third party 50, and attests to the identity of the connected building object 6.

Preferably, the first security certificate 36 of the connected building object 6 is issued by the trusted third party 50 and registered in production in the first public key infrastructure 30 of the connected building object 6. Once issued by the trusted third party 50, the security certificate 36 of the connected building object 6 is tamper-proof, i.e. it cannot be modified.

Advantageously, the trusted third party 50 is constituted by a Certification Authority CA, the Certification Authority's known role being to issue security certificates describing digital identities and to make available means of verifying the validity of the security certificates it has provided.

Advantageously, in one embodiment, the first security certificate 36 of the connected building object 6 is self-signed, for example and advantageously, by the manufacturer of the connected building object 6, the manufacturer acting here as the Certification Authority.

The electronic memory 24 of the connected building object 6 also stores a storage structure 26, for example in the form of a table, as shown schematically in FIG. 2, the storage structure 26 associating values VAL_q, known as access authorisation values, with sets E_q of associated action commands.

The access authorisation values VAL_q are predetermined, for example integer values encoded on a predetermined number of bits.

In one embodiment, each access authorisation value VAL_q is associated with a list of commands $E\_q = \{C_{1q}, \ldots, C_{Pg}\}$. The number of commands in a set (e.g. a list) E_q is greater than or equal to 1. The number of commands per set E_q varies from one set of commands to another.

The number N of access authorisation values is any chosen integer.

For example, the number N is equal to 3, corresponding respectively to three categories of command sets:

a first access authorisation value VAL_1 is associated with basic commands E_1, a second access authorisation value VAL_2 is associated with adjustment commands E_2, and a third access authorisation value VAL_3 is associated with security commands E_3.

In some embodiments, a single command is part of several sets of commands.

The commands can be accessed using the application programming interface, or API, implemented by the processing unit 22 of the associated connected building object 6.

The home automation system 4 also comprises at least one remote controller 8 connected to the communication network 14, the remote controller 8 being configured to control and/or configure the at least one connected building object 6.

Similarly to the connected building object 6, the remote controller 8 comprises a network interface 20' adapted to connect the remote controller 8 to the communication network 14, at least one processing unit 22' connected to the network interface 20', and at least one electronic memory 24' connected to the processing unit 22'.

In one embodiment, the network interface 20' of the remote controller 8 is connected to a human-machine interface 28', enabling interaction with a user: receiving commands, displaying data or information received from the connected building object 6.

The electronic memory 24' of the remote controller 8 contains a public key infrastructure 30'.

The electronic memory 24' of the remote controller 8 stores in the public key infrastructure 30' of the remote controller 8 a second pair of keys 32', 34' of the remote controller 8 consisting of a second private key 32' of the remote controller 8 and a second public key 34' of the remote controller 8, the second private key 32' of the remote controller 8 being associated with the second public key 34' of the remote controller 8, the second private key 32' of the remote controller 8 being configured to decrypt a message which has been encrypted with the corresponding second public key 34' of the remote controller 8.

The electronic memory 24' of the remote controller 8 also stores a second security certificate 36' of the remote controller 8 in the public key infrastructure 30' of the remote controller 8. According to some embodiments, the second security certificate 36' represents the remote controller 8 and is unique to the remote controller 8, or represents a user of the remote controller 8 and in this case is unique to the user of the remote controller 8.

Advantageously, the second security certificate 36' of the remote controller 8 is issued by the same trusted third party 50 as the first security certificate 36 of the connected building object 6 that the remote controller 8 is intended to control; in other words, the first security certificate 36 and the second security certificate 36' are signed by the same trusted third party 50, and for this purpose each contain a signature constructed from the private key of the said trusted third party 50.

In this way, the processing unit 22 of the connected building object 6 can trust a remote controller 8 whose security certificate contains a signature constructed from the same private key as that used to construct the signature contained in its own security certificate.

In a known way, the second security certificate 36' of the remote controller 8 comprises a plurality of fields, the size and purpose of which are standardised. For example, in the case of an X.509-compliant TLS/SSL public key certificate, these fields and their functionalities are described in the IETF document RFC 5280 *"Internet X.509 Public Key Infrastructure Certificate and Certificate Revocation List (CRL) Profile".*

The second security certificate 36' of the remote controller 8, issued by the trusted third party 50, comprises a predetermined field whose value is set to one of the access authorisation values VAL_q, depending on the third party operating the remote controller 8.

For example, in the case of an X.509-compliant TLS/SSL public key certificate, the predetermined field is the "Subject" field, the "Subject" field being made up of a non-zero set of ATTR_q attributes whose known primary function is to identify the entity associated with the public key contained in the security certificate.

Here, the non-zero set of attributes ATTR_q of the "Subject" field of the second security certificate 36' of the remote controller 8 thus has the known primary function of identifying the entity associated with the second public key 34' contained in the second security certificate 36' of the remote controller 8.

In a variant, fields other than the "Subject" field can be used for this purpose, such as the extension field compliant with the third version of the X.509 standard.

For example, in the case of an application where the access authorisation value corresponds to one of the three command set categories detailed above, namely vAL_1 for basic commands, VAL_2 for adjustment commands and VAL_3 for security commands, the value of the attribute ATTR_1 "commonName" (or CN) in the "Subject" field is set to the value VAL_1 when the third party operating the remote controller 8 is a standard user, to the value VAL_2 when the third party operating the remote controller 8 is an agent, and to the value VAL_3 when the third party operating the remote controller 8 is a home automation network installer.

In this way, the predetermined field, for example the "Subject" field of the second security certificate 36' of the remote controller 8, is used in a manner different from its known primary function, to indicate access authorisation for the control of certain actions of the connected building object 6 by the third party operating the remote controller 8. Advantageously, this ensures security in the remote control of the corresponding connected building objects 6.

In a variant, in addition to the Attr_q attribute of the predetermined "Subject" field, the value of which is modified to indicate the access authorisation value of the remote controller 8, referred to in this case as the first attribute Attr_1 of the predetermined field, a second attribute Attr_2 of the predetermined field is used to identify the third party recipient of the second security certificate 36' of the remote controller 8, in other words the third party operating the remote controller 8. The third party recipient of the second security certificate 36' of the remote controller 8 is for example, as indicated above, a user, a maintenance agent or an installer.

For example, the value of the second attribute Attr_2 "organizationName" (or O) is set to a value identifying the recipient third party, for example the name of the organisation receiving the second security certificate 36' from the remote controller 8, the recipient organisation operating the remote controller 8.

The processing unit 22 of the connected building object 6 is configured to implement a module 40 for opening a secure connection with the remote controller 8, the processing unit 22' of the remote controller 8 being configured to implement a module 41 for requesting a secure connection.

Thus, the modules 40 and 41 work together to implement a secure connection 42, using the first security certificate 36 of the connected building object 6 and the second security certificate 36' of the remote controller 8.

For example and in a known manner, the establishment of a secure connection 42 implements the protocol for securing exchanges by TCP/TLS (Transmission Control Protocol/Transport Layer Security) communication network, during which an exchange of security certificates is implemented between the processing unit 22 of the connected building object 6 and the processing unit 22' of the remote controller 8.

In particular, the module 40 for opening a secure connection 42 with the remote controller 8 receives the second security certificate 36' of the remote controller 8, and compares the second digital signature 38' of the second security certificate 36' of the remote controller 8 with the first digital signature 38 of its own security certificate 36, in this case the first security certificate 36 of the connected building object 6. The processing unit 22 of the connected building object 6 then determines whether the two digital signatures 38, 38' are constructed from the same private key associated with the trusted third party 50, and, if necessary, registers the second security certificate 36' of the remote controller 8 in its public key infrastructure 30 as a trusted certificate for the purpose of setting up a master secret key shared with the connected building object 6 and the remote controller 8, this shared master secret key being used to authenticate the building and to encrypt, in other words to encrypt/decrypt, each message exchanged between the connected building object 6 and the remote controller 8.

In this way, a secure connection 42 can be set up between the connected building object 6 and the remote controller 8.

The processing unit 22' of the remote controller 8 is also configured to implement a module 43 for commanding the execution of at least one action by the connected building object 6, the command being sent by the remote controller 8, via the secure connection 42, and according to a high-level communication protocol operating in the application layer of the connected building object 6 (e.g. io-homecontrol, SDN (Somfy Digital Network), Synergy, Matter, etc.) and understandable to the processing unit 22 of the connected building object 6.

Optionally, the processing unit 22' of the remote controller 8 also implements a module 44 for receiving data or information from the connected building object 6. For example, when the connected building object 6 is associated with a sensor, data supplied by the sensor is received from the connected building object 6.

The processing unit 22 of the connected building object 6 is also configured to implement a module 45 for receiving, via the secure connection 42, a command $C_q$ to perform at least one action issued by the remote controller 8.

In addition, the processing unit 22 of the connected building object 6 is further configured to implement a module 46 for extracting the access authorisation value VAL_q from the predetermined field of the second security certificate 36' of the remote controller 8, previously received during the opening of the secure connection 42.

The processing unit 22 also implements a check module 47, which checks whether the received command $C_q$ belongs to the set of stored commands $E\_q = \{C_{1q}, \ldots, C_{Pg}\}$ associated with the extracted access authorisation value VAL_q.

If the check is positive, the processing unit 22 of the connected building object 6 executes the at least one action associated with the received command $C_q$.

Optionally, in the event of a positive check, the processing unit 22 of the connected building object 6 records at least one item of information relating to this positive check in the electronic memory 24 of the connected building object 6, thus enabling traceability of attempts to execute received commands that have produced a positive check.

If the check is negative, it is considered that the remote controller 8 is not authorised for the received command $C_q$, and the at least one action associated with this command is then not executed by the processing unit 22 of the connected building object 6.

Optionally, a warning module 48 is implemented to execute at least one predetermined action in the event of negative check that the command $C_q$ belongs to the set of stored commands $E\_q = \{C_{1q}, \ldots, C_{Pg}\}$ associated with the access authorisation value VAL_q extracted. For example, the predetermined action in the event of a negative check is to send information back to the remote controller 8, which may for example be displayed on the user interface of the remote controller 8, and/or to make the connected building object 6 secure, and/or to record information relating to this negative check in the electronic memory 24 of the connected building object 6, thus enabling traceability of attempts to execute received commands which have produced a negative check.

A programmable electronic device comprising modules 40, 45, 46, 47 and 48 and storing a storage structure 26 forms a device for controlling the execution of at least one action by a connected building object 6.

In the example shown in FIG. 2, modules 40, 45, 46, 47 and 48 are each produced in the form of software, or a software brick, that can be executed by the processing unit 22 of the connected building object 6. These modules form a computer program, also called a computer program product, which, when executed by the processing unit 22, implements the method for controlling the execution of at least one action by the connected building object 6.

This computer program is further adapted to be recorded on a computer-readable medium, not shown. The computer-readable medium is, for example, a medium that can store electronic instructions and be coupled with a bus from a computer system. For example, the readable medium is an optical disk, magneto-optical disk, ROM memory, RAM memory, any type of non-volatile memory (for example FLASH or NVRAM) or magnetic card. The readable medium in such a case stores a computer program comprising software instructions.

In a variant not shown, the modules 41, 45, 46, 47, and 48 are each in the form of a programmable logical component, such as a FPGA (Field Programmable Gate Array), or in the form a dedicated integrated circuit, such as an ASIC (Application-Specific Integrated Circuit).

Figure 3:
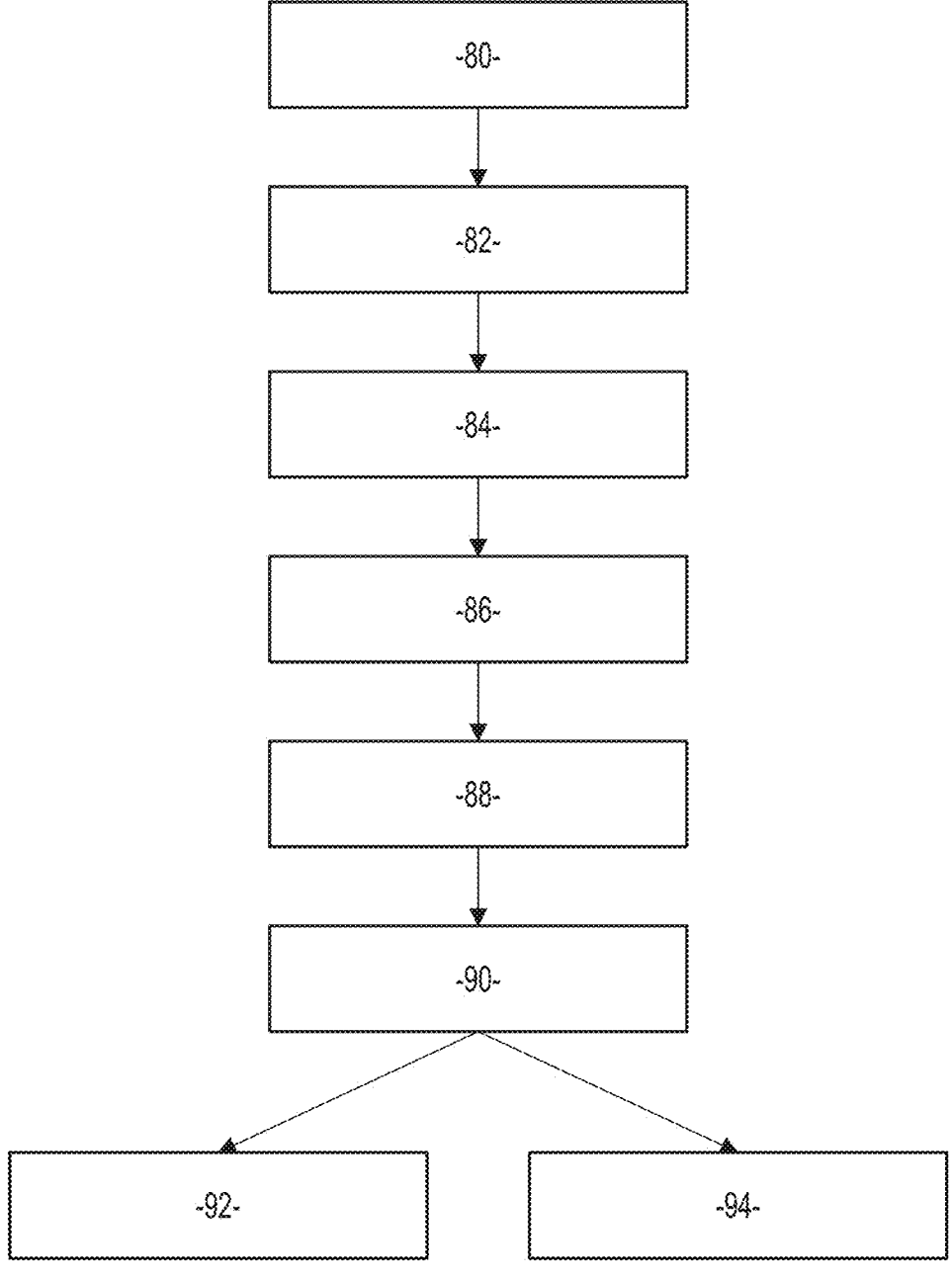
FIG. 3 is a flow chart of the main steps of a method for controlling the execution of at least one action by a connected object in a first embodiment.

FIG. 3 is a flowchart of the main steps in a method for controlling the execution of at least one action by a connected building object 6, the control method being implemented by a processing unit 22 of the connected building object 6.

The method comprises a step 80 of receiving a secure connection request from a remote controller 8, and a step 82 of opening a secure connection using respectively the first security certificate 36 of the connected building object 6 and the second security certificate 36' of the remote controller 8.

The step 82 implements sub-steps corresponding to a TCP/TLS negotiation known from the TCP/TLS protocol for securing communication network exchanges.

During the implementation of step 82 of opening a secure connection 42 with the remote controller 8, the processing unit 22 of the connected object 6 for building receives the second security certificate 36' from the remote controller 8, then determines whether the second security certificate 36' received from the remote controller 8 and the first security certificate 36 of the connected building object 6 are signed by the same trusted third party 50, in order to register, if necessary, the second security certificate 36' of the remote controller 8 as a trusted security certificate in the public key infrastructure 30 contained in its electronic memory 24.

To determine whether the second security certificate 36' of the received remote controller 8 and the first security certificate 36 of the connected building object 6 are signed by a same trusted third party 50, the processing unit 22 of the connected building object 6 compares the digital signature 38' of the second security certificate 36' of the remote controller 8 received with the digital signature 38 of its own security certificate 36, in this case the first security certificate 36' of the connected building object 6, and checks that the digital signature 38' of the security certificate 36' of the remote controller 8 and the digital signature 38 of the connected building object 6 are constructed from the same private key associated with the same trusted third party 50.

Advantageously, registration of the second security certificate 36' of the remote controller 8 as a trusted security certificate is carried out automatically by the processing unit 22 of the connected building object 6.

Similarly, when the step 82 of opening a secure connection 42 with the connected building object 6 is implemented, the processing unit 22' of the remote controller 8 receives the first security certificate 36 of the connected building object 6, then determines whether the received first security certificate 36 of the connected building object 6 and its own security certificate 36', in this case the second security certificate 36' of the remote controller 8, are signed by the same trusted third party 50, in order to register, if necessary, the first security certificate 36 of the received connected building object 6 as a trusted security certificate in the public key infrastructure 30' contained in its electronic memory 24'.

Advantageously, registration of the received first security certificate 36 of the connected object 6 as a trusted security certificate is carried out automatically by the processing unit 22' of the remote controller 8.

In a variant, registration of the first security certificate 36 of the connected building object 6 received as a trusted security certificate from the remote controller 8 may require prior validation by the third party operating the remote controller 8, for example by submitting to the third party operating the remote controller 8, via the human-machine interface 28, an interface for accepting/refusing to register the received security certificate 36 of the connected building object 6 as a trusted security certificate from the remote controller 8.

In this way, when each security certificate 36, 36' is respectively registered by the remote controller 8 and the connected object 6 to be stored as a trusted certificate, the step 82 of opening a secure connection sets up, in a known manner, a master secret key shared with the connected building object 6 and the remote controller 8, this shared master secret key making it possible to authenticate and encrypt, in other words to encrypt/decrypt, each message exchanged between the connected building object 6 and the remote controller 8 via the secure connection 42.

In this way, an execution command can be sent in encrypted form via the secure connection to the connected building object 6 from the remote controller 8.

Advantageously, if during the step 82 of opening a secure connection, at least one of the processing unit 22 of the connected building object 6 and the processing unit 22' of the remote controller 8, determines that the first security certificate 36 of the connected building object 6 and the second security certificate 36' of the remote controller 8 are signed by different third parties, at least one of which is the processing unit 22 of the connected building object 6 and the processing unit 22' of the remote controller 8 can reject and/or block the opening of a secure connection between the connected building object 6 and the remote controller 8.

The method then involves receiving 84, via the secure connection 42, a command for the connected building object 6 to perform at least one action.

In a step 86, the value of a predetermined attribute ATTR_q of a predetermined field of the second security certificate 36' of the remote controller 8 is extracted, this value corresponding to the access authorisation value VAL_q of the remote controller 8. The predetermined attribute ATTR_q is, for example, the "commonName" (or CN) attribute of the "Subject" field of an X.509-compliant TLS/SSL public key security certificate.

In a variant, the access authorisation value VAL_q of the remote controller 8 is extracted from a first predetermined attribute ATTR_1 of a predetermined field of the second security certificate 36', and an identifier ID of the third party operating the remote controller 8 is extracted from a second attribute ATTR_2 of the predetermined field of the second security certificate 36'.

In general, the access authorisation value VAL_q of the remote controller 8 is extracted from any attribute of any field of the second security certificate 36' of the remote controller 8, provided that the value of this attribute can be set to one of the access authorisation values VAL_q of the remote controller 8 while preserving the basic operation of the second security certificate 36' of the remote controller 8 for implementing the opening of a secure connection 42 between the remote controller 8 and the connected building object 6.

In one embodiment, the access authorisation value VAL_q of the remote controller 8, and optionally the identifier ID of the third party operating the remote controller 8, are stored (step 88) in the electronic memory 24 of the connected building object 6.

In addition, when the identifier ID of the third party operating the remote controller 8 is obtained, the method comprises storing in a log file at least one item of information indicating the command and the identifier of the third party operating the remote controller 8. This makes it possible to store a log of the requested executions, with any additional information, such as the date and time the commands were received.

The method then comprises a step 90 of checking, in the structure for storing associations of access authorisation values and sets of commands, whether the command received in step 84 belongs to the set of commands associated with the access authorisation value VAL_q of the remote controller 8.

If the check is positive, the command is executed (step 92).

If the check is negative, the command is not executed.

Optionally, in the event of a negative check, a warning step 94 is implemented.

In one embodiment, described with reference to FIG. 4, the connected building object 6 is adapted to establish a number P of secure connections 42 in parallel, P being an integer strictly greater than 1, for example P=5.

Figure 4:
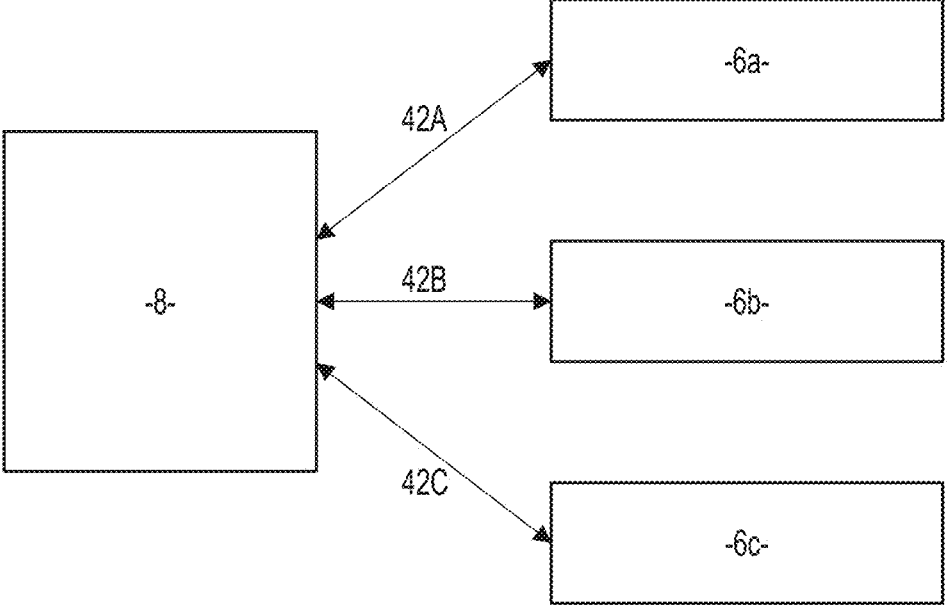
FIG. 4 is a schematic representation of a variant of the communication system of FIG. 2.

In FIG. 4, three secure connection channels 42A, 42B, 42C are illustrated by way of example, the connected building object 6 having established in parallel a first secure connection 42A with a controllable device 6a, a second secure connection 42B with a command unit 6b, and a third secure connection 42C with a sensor 6c.

Advantageously, the processing unit 22 of the connected building object 6, having received a secure connection request from a remote controller 8, can be configured to reject the opening of a secure connection with this remote controller 8, if the number P of parallel secure connections 42 already established by the connected building object 6 is greater than or equal to a predetermined number P_max that is an integer strictly less than P, and if none of the values of the predetermined attributes ATTR_q extracted from each security certificate having enabled the number P_max of secure connections to be established with the connected building object 6, is equal to a predetermined access authorisation value VAL_q of the remote controller 8.

In this way, the connected building object 6 can reserve at least one secure connection with a remote controller 8 whose value of a predetermined attribute ATTR_q of a predetermined field of the second security certificate 36' of the remote controller 8 is equal to a predetermined access authorisation value VAL_q of the remote controller 8. This ensures that an authorised remote controller 8 can intervene to update or configure the operating parameters or program code implemented by the connected building object 6.

More generally, other variants can be envisaged, for example a secure connection can be reserved for each type of third party operating a remote controller 8 (e.g. user, installer, maintenance).

Figure 5:
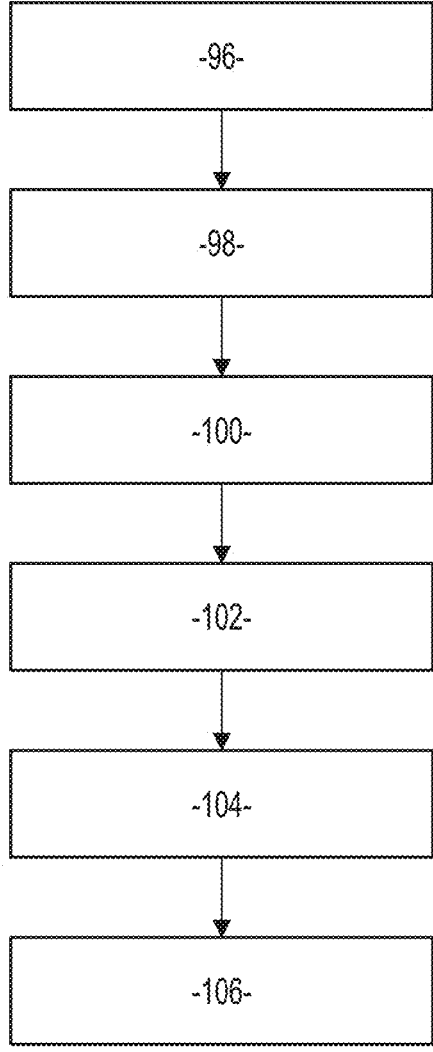
FIG. 5 is a flowchart of the main steps of an example application of the method for controlling the execution of at least one action by a connected object in the context of updating at least one connected building object from a remote controller.

FIG. 5 illustrates an example application of the method for controlling the execution of at least one action by a connected building object 6, the action corresponding in this example to a secure update of at least one program executable by the processing unit 22 of the connected building object 6.

For this example, the second security certificate 36' of the remote controller 8 comprises a predetermined field in which the value of a predetermined attribute ATTR_q of this predetermined field is set to an access authorisation value VAL_2 of the remote controller 8, the access authorisation value VAL_2 being associated with a set of adjustment commands E_2 of the connected building object 6.

In this embodiment, the method comprises a step 96 of downloading and storing in an electronic memory of the connected building object 6, a file updating one or more functionalities and/or one or more parameters of at least one executable program implemented by the processing unit 22 of the connected building object 6.

For example, the download is carried out via an FTP (File Transfer Protocol) connection between the communication interface 20 of the connected building object 6 and an FTP client (e.g. FileZilla) remote from the connected building object 6.

Advantageously, the electronic memory can be a FLASH memory connected to the processing unit 22 of the connected object, thereby allowing the downloaded update file to be automatically emptied from the memory in the event that opening a secure connection subsequently fails.

The method then comprises a step 98 of opening a secure connection, the step 98 of opening a secure connection being implemented following a secure connection request step received from the remote controller 8 by the connected building object 6. The step 98 of opening a secure connection respectively uses the first security certificate 36 of the connected building object 6 and the second security certificate 36' of the remote controller 8, in a similar way to what was described for the secure connection opening step 82 with reference to FIG. 3.

The downloading step 96 can be implemented either before or after the secure connection opening step 98.

The method then comprises a step of receiving 100 a command $C_1$ to execute the previously downloaded update file, the execution command $C_1$ being sent by the remote controller 8, via the secure connection opened in step 98, using a high-level communication protocol operating at the application layer of the connected building object 6 (e.g. io-homecontrol, SDN, Synergy, Matter, etc.) and understandable by the processing unit 22 of the connected building object 6.

The method then comprises a step 102 of extracting the access authorisation value VAL_2 from the second security certificate 36' of the remote controller 8, and a step 104 of checking that the received command $C_1$ is indeed contained in the set of commands E_2 associated with the extracted access authorisation value VAL_2 of the remote controller 8, this association being stored in the storage structure 26 stored in the electronic memory 24 of the connected building object 6. The extraction step 102 and checking step 104 correspond respectively to the extraction step 86 and checking step 90 described with reference to FIG. 3.

Since the received command $C_1$ in this case is indeed contained in the set of commands E_2 associated with the access authorisation value VAL_2 extracted from the remote controller 8, the method then comprises a step 106 of executing the update file.

Other embodiments can of course be deduced by a person skilled in the art from the embodiments described above.

The invention claimed is:

1. A method for controlling the execution of at least one action by a connected building object in a communication network, said connected building object comprising a network interface allowing connection to said communication network, said execution of the at least one action being commanded by a remote controller adapted to connect to said communication network, the method being implemented by a processing unit of said connected building object adapted to execute the at least one action of the connected building object, and comprising at least the steps of:

opening a secure connection between said connected building object and the remote controller by implementing a first security certificate of the connected building object and a second security certificate from the remote controller, wherein the step of opening the secure connection allows encrypted communication between said connected building object and the remote controller, and further comprising reception of the second security certificate from the remote controller;

receiving, via said secure connection, a command to execute said at least one action issued by said remote controller, according to a communication protocol;

extracting a value from a predetermined field of the remote controller's second security certificate, referred to as the remote controller's access authorisation value;

checking, in a storage structure for storing associations between access authorization values and sets of authorized commands, that said received command belongs to a set of at least one authorized command associated with said access authorisation value, the storage structure being stored in an electronic memory of said connected building object; and when the check is positive, executing said at least one action associated with the received command.

2. The method according to claim 1, further comprising a step wherein, in the event of a negative check, said at least one action associated with the received command is not carried out, and a warning is sent via said secure connection.

3. The method according to claim 1, wherein the extraction step further comprises extracting a second value from a predetermined field of the second security certificate from the remote controller in order to obtain an identifier of a third party operating said remote controller.

4. The method according to claim 3, further comprising a step of storing, in an execution report, said received command in association with the identifier of the third party operating said remote controller.

5. The method according claim 1, further comprising the processing unit of the connected building object being configured to open a plurality of secure connections in parallel, wherein the opening of a secure connection with a given remote controller depends on the access authorisation value extracted from the second security certificate of said remote controller.

6. The method according to claim 1, wherein the checking step implements the storage structure in the form of a table associating, with each access authorisation value of the remote controller, a list of at least one command for the execution of at least one action by the connected building object.

7. The method according to claim 1, further comprising the connected building object storing the first security certificate of the connected building object, wherein in the step of opening the secure connection, the processing unit of the connected building object determines whether the second security certificate received from the remote controller and the first security certificate of the connected building object are signed by the same trusted third party, in order to register the second security certificate from the remote controller as a trusted security certificate in a public key infrastructure contained in its electronic memory.

8. The method according to claim 1, further comprising a step of downloading into the electronic memory of the connected building object an update file storing at least one executable program implemented by the processing unit of the connected building object, wherein the received command is one command out of a set of commands for adjusting the connected building object, wherein the at least one action associated with the received command includes executing the update file.

9. The method according to claim 1, wherein said connected building object is a home automation device of an automation system for a building.

10. A non-transitory computer readable medium comprising software instructions which, when executed by a programmable electronic device, implement the method for controlling the execution of at least one action by a connected building object according to claim 1.

11. A system for controlling the execution of at least one action by a connected building object in a communication network, the system comprising:

a remote controller adapted to connect to said communication network and to command the execution of said at least one action by the connected building object; and the connected building object;

wherein the connected building object comprises:

a network interface allowing connection to said communication network;

a processor adapted to execute said at least one action of the connected building object, and comprising at least:

an opening module that opens a secure connection between said connected building object and the remote controller by implementing a first security certificate of the connected building object and a second security certificate from the remote controller, wherein the opening of the secure connection allows encrypted communication between said connected building object and the remote controller, and further comprising reception of the second security certificate from the remote controller;

a receiving module that receives, via said secure connection, a command to execute said at least one action issued by said remote controller, according to a communication protocol;

a module for extracting a value from a predetermined field of the remote controller's second security certificate, referred to as the remote controller's access authorisation value;

a module for checking, in a storage structure for storing associations between access authorization values and sets of authorized commands, that said received command belongs to a set of at least one authorized command associated with said access authorisation value, the storage structure being stored in an electronic memory of said connected building object; and a module for executing, when the check is positive, said at least one action associated with the received command.

* * * * *